Figure 1:
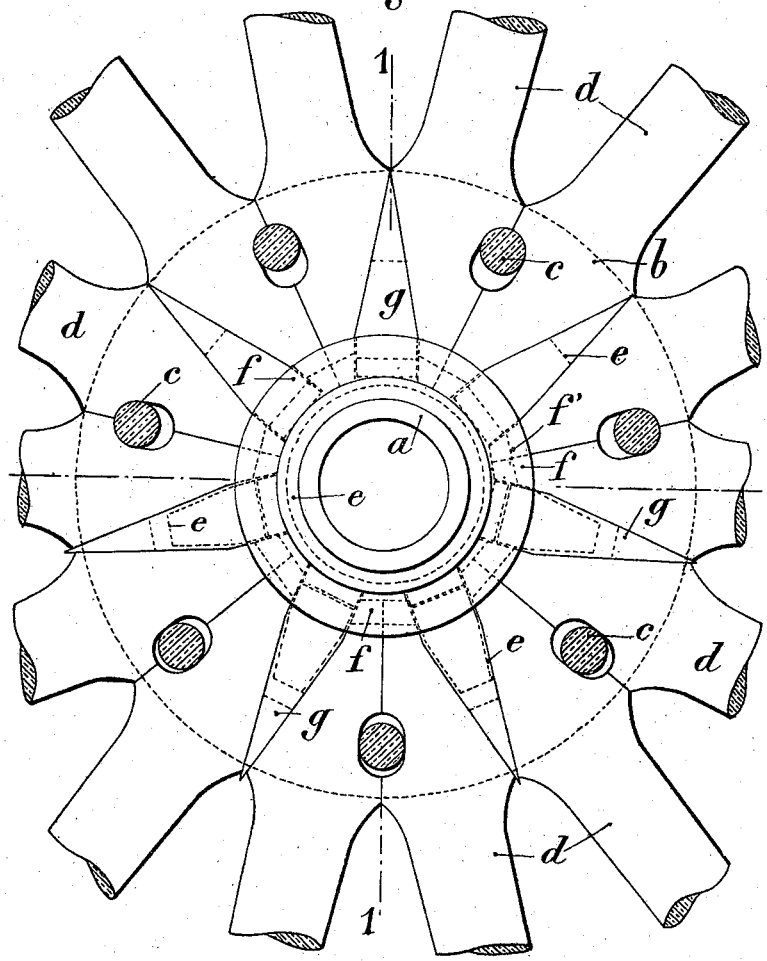

No. 867,645. PATENTED OCT. 8, 1907.
J. L. DELHOMME.
SPOKE TIGHTENING DEVICE.
APPLICATION FILED SEPT. 29, 1906.

2 SHEETS—SHEET 1.

No. 867,645. PATENTED OCT. 8, 1907.
J. L. DELHOMME.
SPOKE TIGHTENING DEVICE.
APPLICATION FILED SEPT. 29, 1906.
2 SHEETS—SHEET 2.
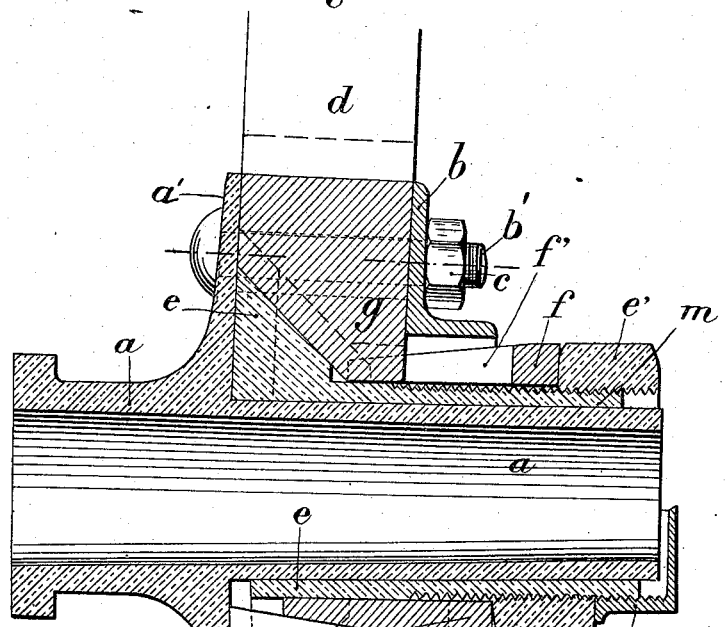
Fig. 2.
Fig. 3.
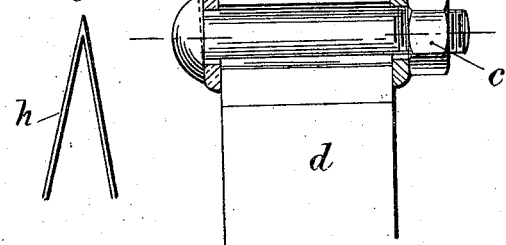

UNITED STATES PATENT OFFICE.

JEAN LÉON DELHOMME, OF LYON, FRANCE.

SPOKE-TIGHTENING DEVICE.

No. 867,645.  Specification of Letters Patent.  Patented Oct. 8, 1907.

Application filed September 29, 1906. Serial No. 336,770.

*To all whom it may concern:*

Be it known that I, JEAN LÉON DELHOMME, a citizen of the Republic of France, residing at 30 Route de Vienne, Lyon, in the Republic of France, have invented new and useful Improvements in Spoke-Tightening Devices, of which the following is a specification.

This invention relates to improvements in spoke tightening and loosening devices, and has for its objects to provide a construction which will effect the tightening of wheels while avoiding the operations of reducing the felly and retiring the wheel, to enable the wheels to be readily taken to pieces, to be easily repaired and reassembled with facility.

With these objects in view, the invention consists in providing means for displacing the spokes radially from the nave or hub while insuring contact of the feet of the displaced spokes.

The inventive idea may receive a variety of mechanical expressions, one of which is illustrated in the accompanying drawings, in which—

Figure 1 is a front elevational view of the nave of a wheel provided with my improvements, certain parts of the construction being removed to show the spokes in the upper half of the view in unextended position and those in the lower half in extended position; Fig. 2 is a transverse central sectional view taken on the line 1—1 of Fig. 1, including additional features. Fig. 3 is a detail.

Referring to Fig. 2, the body portion of the nave or hub $a$ is provided with a flange $a'$ fast thereto against which the feet of the spokes $d$ of the wheel are pressed by means of bolts $b'$ taking through oblong openings in flange $a'$, spokes $d$ and adjustable disk $b$. A nut $c$ enables the parts to be securely held in position. The spoke socket $m$ mounted on the cylindrical portion of the body of the hub $a$ is provided along its reduced end with an exterior screw-thread and at its enlarged end with star-shaped or radial branches or members $e$. The face of each of said branches or members $e$ which is directed towards the screw-threaded end is shaped so as to have a plane perpendicular to the middle plane of the branch $e$ and inclined to the generating lines of the socket $m$. Beneath the feet of each pair of spokes $d\,d$ rests a key wedge piece $f'$. These wedges when used in heavy wheels are preferably of iron, and in the case of light wheels they may be of hard wood. Means for forcing these wedges beneath the spoke feet to displace the spokes outward are shown in Fig. 2. A ring $f$ is loosely mounted on the cylindrical portion of the socket member $m$ at the bases of the wedges which may be integral with the ring or separable therefrom, and is movable lengthwise to the axis of the hub by aid of a threaded nut $e'$ on socket $m$, and may be provided with a nut-locking member $e''$ of any approved style. Nut $e'$, when turned to move it toward the spoke sockets, forces wedges $f'$ beneath the feet of the spokes and displaces the latter towards the rim of the wheel. Such displacement would tend to separate the feet of the spokes, and to avoid this, tightening wedges $g$ of metal or wood are inserted between the beveled faces of each pair of spoke feet and the spoke retaining flanges or disks $a'$, $b$. The face of each of the tightening wedges $g$ is beveled as shown in Fig. 2, and bears on the corresponding inclined face of the member $e$ on the spoke socket $m$. This construction enables the wedges $g$ to be adjusted radially by turning the nut $e'$ on the socket $m$.

The action of the device consists in producing at will, and without taking to pieces, a divergent movement of the spokes capable of applying to the latter a very considerable pressure on the felly and on the nave, at the same time keeping the lateral contact of the feet of these spokes.

The divergent movement of the spokes and the keying of the latter on the nave are effected by the wedges $f'$ of the ring $f$, which enter between the end of the spokes and the nave, and submitted to a pressure derived from the nut $e'$ of the star-shaped socket, thrust along the latter parallel to the axis of the wheel, and in the direction of the star. The lateral contact of the feet of these spokes is obtained at the same time as the longitudinal gripping of these spokes by a displacement of the star-shaped socket $e$—$m$ parallel to that of the ring and in the opposite direction to it. These two displacements of the socket and of the ring are given simultaneously to the two parts by the gripping of the nut $e'$. In its displacement, the socket $e$—$m$ sliding by the inclined planes of the branches $e$ of the star produces a divergent movement of these wedges which fill the space left free between the feet of the spokes, and thus insure contact between the lateral faces of these feet. Thus, by this double divergent movement of the spokes and wedges, not only can a wheel be repeatedly tightened but also a damaged wheel can be taken to pieces.

If the length of stroke of the spoke tightening device is insufficient to take up all the slackness produced by the drying of the wood or the wear and tear of the bearing surfaces, the wheel would have to be taken to pieces and, without facility, key-wedges $f'$ and wedges $g$ replaced or the size of these wedges increased when in metal. To increase the size of these wedges, it is necessary to add to each a piece of metallic packing $h$ (Fig. 3) otherwise the interposition of simple metallic plates between the ends of the spokes and the key wedges would be sufficient to increase the thickness of the latter. The thickness of these plates must be determined by the distance the wedges $g$ have to travel after tightening the wheel to take up fresh slackness without fresh plates.

What is claimed is:

1. In a spoke-tightening device for vehicle wheels, the combination of a nave, a spoke socket thereon having a plurality of wedge displacing members integral therewith, a plurality of tightening wedges engaging said members, a plurality of key wedges for displacing the spokes outward alternating with said tightening wedges, and wedge actuating means common to both sets of wedges.

2. In a spoke-tightening device for vehicle wheels, the combination of a nave having flanges, a screw-threaded spoke socket provided with a plurality of wedge displacing members having faces inclined to the axis of the nave, spoke-tightening wedges between said flanges and engaging said displacing members, a plurality of spoke displacing wedges, and a nut on said spoke socket for actuating said wedges.

3. In a spoke tightening device for vehicle wheels, the combination of a nave, a spoke socket movable thereon spokes engaging said spoke socket, spoke displacing wedges, tightening wedges between the spokes, and wedge moving means for simultaneously adjusting said wedges to displace the spokes radially and tighten the feet of the spokes in the spoke socket.

4. In a device of the character described, the combination of a nave, a spoke socket movable thereon, spokes engaging said socket, a plurality of wedges and wedge moving means for displacing the spokes radially and for tightening the feet of the spokes in the spoke socket.

In testimony whereof I have signed my name to this specification in the presence of two subscribing witnesses.

JEAN LÉON DELHOMME.

Witnesses:
EMILE BERT,
HANSON C. COXE.